United States Patent
Murakami

Patent Number: 6,137,944
Date of Patent: Oct. 24, 2000

[54] IMAGE RECORDING/REPRODUCING APPARATUS

[75] Inventor: Kei Murakami, Ibaraki, Japan

[73] Assignee: Matsushita Electric Industrial Co., Ltd., Osaka, Japan

[21] Appl. No.: 08/998,201

[22] Filed: Dec. 24, 1997

[30] Foreign Application Priority Data

Dec. 26, 1996 [JP] Japan .................................. 8-347251

[51] Int. Cl.[7] .............................. H04N 5/76; H04N 5/92
[52] U.S. Cl. .................................. 386/46; 386/52; 386/66
[58] Field of Search .......................... 360/13, 15; 386/4, 386/52–53, 55–66, 131, 94, 129; 358/335, 140; 371/2.1

[56] References Cited

U.S. PATENT DOCUMENTS

| | | | |
|---|---|---|---|
| 4,363,049 | 12/1982 | Ohtsuki et al. | 360/13 |
| 4,805,036 | 2/1989 | Kido et al. | 358/335 |
| 4,862,292 | 8/1989 | Enari et al. | 360/8 |
| 4,943,866 | 7/1990 | Barker et al. | 358/335 |
| 5,181,111 | 1/1993 | Hedley et al. | 358/40 |
| 5,493,413 | 2/1996 | Rhodes | 358/335 |
| 5,504,532 | 4/1996 | Rhodes | 348/458 |
| 5,617,218 | 4/1997 | Rhodes | 386/129 |
| 5,878,185 | 3/1999 | Takahashi | 386/74 |
| 5,940,411 | 8/1999 | Takeda | 371/2.1 |
| 5,960,151 | 9/1999 | Takahashi | 386/94 |

Primary Examiner—Thai Tran
Attorney, Agent, or Firm—Ratner & Prestia

[57] ABSTRACT

An apparatus having two or more digital video tape recorders provides high-quality digital data copying. The apparatus comprises a first digital video tape recorder; a second digital video tape recorder; a transfer unit which receives data on a first data bus, delays the data by a time T3, and outputs the delayed data to a second data bus synchronized to a recording synchronizing signal; and a controller for producing a reproducing synchronizing signal and a recording synchronizing signal, and controlling the transfer unit. The first digital video tape recorder comprises a first reproducing circuit for converting data read from a tape to a specified transfer format, and outputs the converted data to the first data bus synchronized to the reproducing synchronizing signal; and a second reproducing circuit for receiving data on the first data bus, delaying the data for a time T1, converting the delayed data to an external format, and outputting it. The second digital video tape recorder comprises a second recording circuit for delaying data in an external format received from outside by a time T2, converting the delayed data to the transfer format, and outputting converted data to the second data bus synchronized to the recording synchronizing signal; and a first recording circuit for receiving data on the second data bus synchronized to the recording synchronizing signal, converting it to a recording format, and recording it on a tape. The timing of the reproducing synchronizing signal is advanced by the delay time T3 relative to the timing of the recording synchronizing signal.

12 Claims, 2 Drawing Sheets

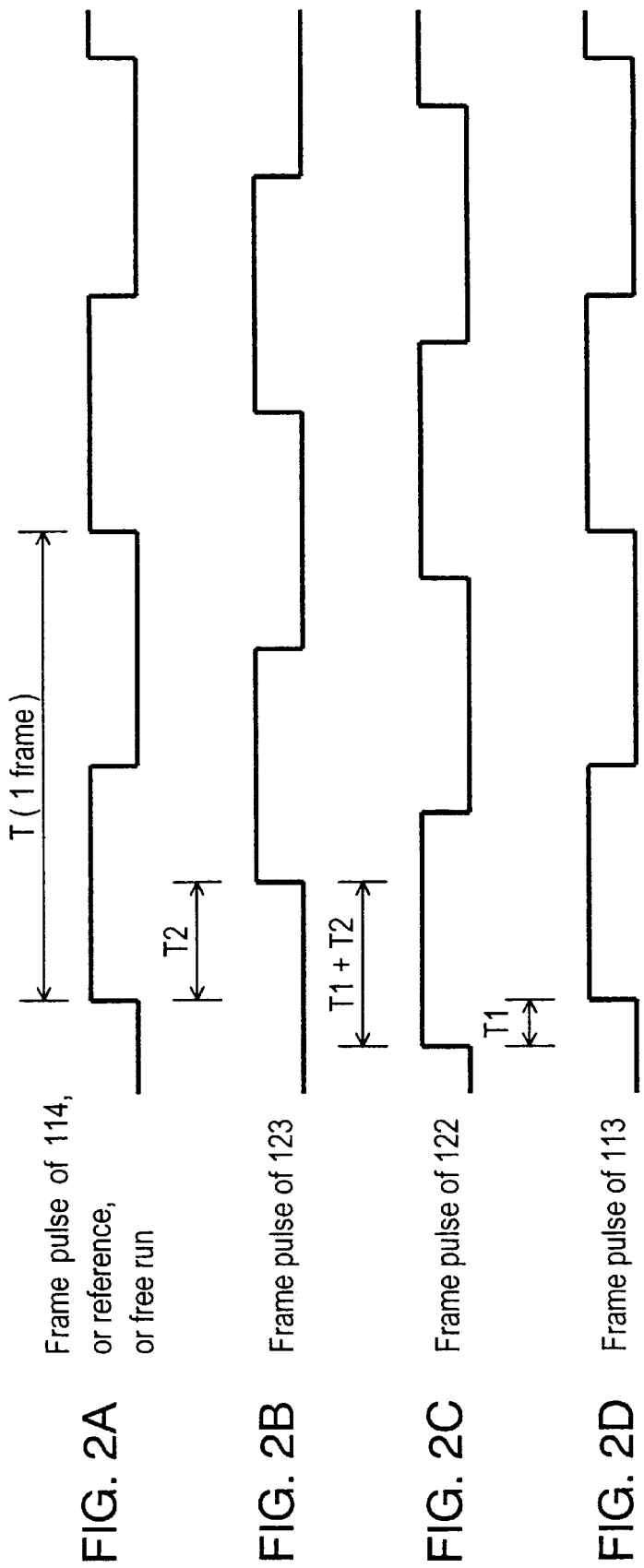

IMAGE RECORDING/REPRODUCING APPARATUS

FIELD OF THE INVENTION

The present invention relates to the field of image recording and more particularly, to reproducing apparatus. Specifically, digital video tape recorders are disclosed.

BACKGROUND OF THE INVENTION

For copying data between tapes using two digital video tape recorders, at present it may be necessary to connect two digital video tape recorders via a cable, for example, and transmit video data as analog signals such as analog component signals and analog composite signals or as digital signals such as serial component digital signals (e.g. SMPTE259M-C).

Transmission of video signals as analog signals, however, may require D/A conversion of video data at the reproduction side, and A/D conversion of video data at the recording side. These conversions may degrade the high picture quality inherent in digital video tape recorders and, thus, video data is significantly degraded in the data copying process. Degradation of picture quality may be greatly improved by transmitting video data in a serial component digital signal form but this may require a high-speed digital interface circuit on both the reproduction and recording sides, resulting in a larger and more expensive image recording and reproducing apparatus.

SUMMARY OF THE INVENTION

The present invention offers a video recording and reproducing apparatus with two built-in digital video tape recorders which uses a transmission method having fewer reproducing and recording processes compared to the prior art. This may result in a smaller and less expensive circuit configuration by transmitting data internally employing a data bus. The present invention also offers a video recording and reproducing apparatus which allows the exchange of video data with other editing equipment for copying data. In this way, time base compatibility with other conventional editing equipment may be maintained.

More specifically, the image recording and reproducing apparatus of the present invention employs a first digital video tape recorder, a second digital video tape recorder, a transfer unit which receives the data on a first data bus, delays it for a time T3, and outputs the delayed data to a second data bus synchronized to a recording synchronizing signal, and a controller which generates the reproducing synchronizing signal and recording synchronizing signal and controls the transfer unit. The first digital tape recorder comprises a first reproducing circuit which converts data read from a tape to a specified transmission format and outputs the data to the first data bus synchronizing the data to the reproduction synchronizing signal. A second reproducing circuit receives the data on the first data bus, converts the data to an external format after delaying it for a time T1, and outputs the converted data to other equipment. The second digital video tape recorder comprises a second recording circuit which receives data in an external format, converts the data to the transfer format after delaying for a time T2, and outputs the data to a second data bus synchronized to the recording synchronizing signal. A first recording circuit receives the data on the second data bus synchronized to the recording synchronizing signal, converts the data to a recording format, and records it on a tape. The timing of the reproducing synchronizing signal is advanced relative to the recording synchronizing signal by a delay time T3.

BRIEF DESCRIPTION OF THE DRAWINGS

FIGS. 2A–2D are a timing chart for the frame pulse in accordance with an exemplary embodiment of the present invention.

DESCRIPTION OF THE PREFERRED EMBODIMENTS

Figure 1:
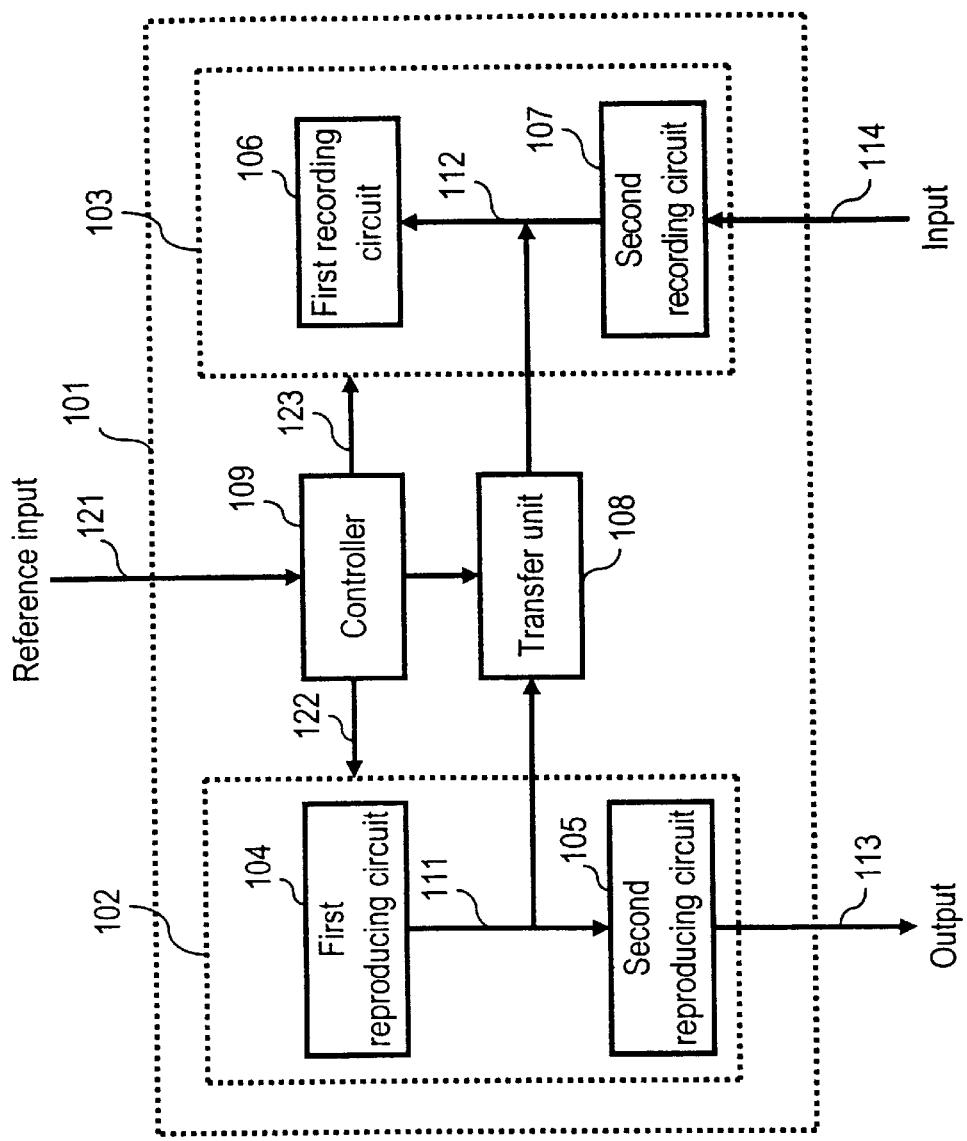
FIG. 1 is a block diagram in accordance with an exemplary embodiment of the present invention.

An exemplary embodiment of the present invention is explained with reference to FIGS. 1 and 2A–2D.

An image recording and reproducing apparatus of the present invention comprises a first digital video tape recorder 102 which has at least a reproduction function, a second digital video tape recorder 103 which has at least a recording function, a transfer unit 108 with a Random Access Memory (RAM), and a controller 109. The first digital video tape recorder 102 comprises a first reproducing circuit 104 for converting the data read from the tape to a specified format (hereinafter referred to as the transfer format) in accordance with the reproducing synchronizing signal, a second reproducing circuit 105 for converting the data in the transfer format to an external format for outputting the data to monitors and external editing equipment, for example, and a first data bus 111 for linking the first reproducing circuit 104 and second reproducing circuit 105. The second digital video tape recorder 103 comprises a first recording circuit 106 for receiving the data in the transfer format and recording it on a tape in accordance with the recording synchronizing signal, a second recording circuit 107 for converting video data received in external formats from cameras and external editing equipment, for example, to the transfer format, and a second data bus 112 for linking the first recording circuit 106 and second recording circuit 107.

The transfer unit 108 has at least a memory to which digital data in the transfer format is written and read. The memory has a capacity to sustain the written and read data for at least a predetermined time T3. Thus, the memory can sustain data read from the first data bus 111 for the time T3, and transmit it to the second data bus 112. The controller 109 produces a reproducing synchronizing signal 122 and recording synchronizing signal 123 for conducting signal processing in the first digital video tape recorder 102 and the second digital video tape recorder 103, and also controls the transfer unit 108. Data in the transfer format on the first data bus 111 is synchronized in accordance with the reproducing synchronizing signal and transmitted. Data in the transfer format on the second data bus 112 is synchronized in accordance with the recording synchronizing signal and transmitted.

The first digital video tape recorder 102 outputs external video data 113 which includes the reproducing synchronizing signal. The second digital video tape recorder 103 receives external input video data 114 containing the recording synchronizing signal. The reference input 121 is input to the controller 109. The controller 109 outputs the reproducing synchronizing signal 122 and recording synchronizing signal 123 to the first digital video tape recorder 102 and the second digital video tape recorder 103, respectively.

The second data bus 112 carries video data output from the second recording circuit 107 during normal recording and video data output from the transfer unit 108 during data copying, and supplies either video data to the first recording circuit 106. Switching of video data to be carried on the second data bus 112 is determined by the controller 109 or other controllers in the video recording and reproducing apparatus. Here, when a delay time of the video data generated by the second reproducing circuit 105 is T1 and a delay time of video data generated by the second recording circuit 107 is T2, for example, the time T3 may require that T3=T1+T2 be satisfied.

The digital data copying operation of the video recording and reproducing apparatus 101 as configured above is explained next.

When the external input video data 114 is received, the controller 109 produces the recording synchronizing signal 123 based on the synchronizing signal of the external input video data 114 delayed by a time T2. When there is no external input video data 114 and there is only the reference input 121 as input data, the controller 109 produces the recording synchronizing signal 123 delayed by a time T2 with respect to the reference input 121.

When there is no external input video data 114 or reference input 121, the controller 109 produces the recording synchronizing signal 123 with a free run timing.

Next, the controller 109 produces the reproducing synchronizing signal 122 at a time T1+T2 ahead of the timing of the generated recording synchronizing signal 123. The controller 109 further generates a write control signal for the transfer unit 108 synchronized to the reproducing synchronizing signal 122, and a read control signal for the transfer unit 108 synchronized to the recording synchronizing signal 123. The video recording and reproducing apparatus 101 determines the data copying area for data copying. In the data copying area, the video data is output from the first reproducing circuit 104 to the second data bus 112 through the transfer unit 108. Out of the data copying area, the video recording and reproducing apparatus 101 switches the output to the second data bus 112, and the video data from the second recording circuit 107 is output to the second data bus 112.

In accordance with signals produced by the controller 109 as explained above, the first reproducing circuit 104 reads data from the tape in accordance with the reproducing synchronizing signal 122, converts it to the transfer format, and outputs the converted data to the first data bus 111, while synchronizing the video data to the reproducing synchronizing signal 122. The second reproducing circuit 105 receives the video data output to the first data bus 111, and outputs the data in an external format after a time T1. At the same time, the video data output to the first data bus 111 is written into the transfer unit 108 in accordance with the write control signal. The written data is stored in the transfer unit 108, and is read in accordance with the read control signal, after the time T3, to the second data bus 112 as data synchronized to the recording synchronizing signal 123.

The video data output to the second data bus 112 is input to the first recording circuit 106, if the video data is in the data copying area, and recorded onto the tape. If the video data is from the data copying area, the video data to be output to the second data bus 112 is switched to the output of the second recording circuit 107. The first recording circuit 106 records the output of the second recording circuit 107, or terminates recording if it is not necessary.

With the above control, the present invention achieves the copying of digital data without the need for the video data to be sent through the second reproducing circuit 105 and the second recording circuit 107. A timing chart for the frame pulse for the synchronizing signals, which are the references for each piece of data in the operation, is shown in FIG. 2. The image recording and reproducing apparatus 101 starts its operation based on the timing of the reference input 121 (which is the system reference timing if it exists), the timing of the external input video data 114 if there is an input from outside, or the free run timing of the controller if there is no input from either the reference input 121 or external input data 114. First, the timing of the recording synchronizing signal 123 is delayed by the delay time T2 generated in the second recording circuit 107. Next, the timing of the reproducing synchronizing signal 122 is advanced by a time T1+T2 ahead of the recording synchronizing signal 123. The timing of the externally output video data from the first digital video tape recorder 102 is delayed for the time T1 compared to the reproducing synchronizing signal 122. In other words, the timing of the video data 113 output from the first digital video tape recorder 102 becomes the same as the timing of the reference signal of the reference input 121, the external input video data 114, or the free run reference signal. Thus, the image recording and reproducing apparatus 101 matches the timing of the input and output of the video signal. Accordingly, interface with other editing equipment and monitors may be easily realized.

By employing a buffer or latch instead of the transfer unit 108 in the present invention, an inexpensive apparatus for data transfer without degrading the performance of data copying may be realized.

The present invention also facilitates the transfer of digital data between digital video tape recorders by advancing the timing of the reproduction process in the first digital video tape recorder by the delay time generated in the transfer unit during transfer compared to the timing of the recording process in the second digital video tape. This may be accomplished without the need for the video data to be sent through multiple reproducing and recording processes. For example, a second reproducing circuit and a second recording circuit.

The image recording and reproducing apparatus of the present invention employs a transfer unit such as a buffer, latch, and memory. The transfer unit connects the data buses using the same reproducing and recording format in the two digital video tape recorders. The transfer unit advances the timing of the reproduction synchronizing signal by the delay time T3, generated in the transfer unit, in comparison with the timing of the recording synchronizing signal, when transferring data for copying, by supplying data in the data copying area to the digital video tape recorder synchronizing to the recording synchronizing signal 123.

The image recording and reproducing apparatus of the present invention may also set the delay time T3 in the transfer unit to the delay time T1 in the second reproducing circuit. The transfer unit may comprise a memory with a capacity which can hold data in the transfer format for the time T1. The time T1 may be used for matching the timing required to supply data from the first digital video tape recorder to the second digital video tape recorder and the timing to output data from the second reproducing circuit.

This allows the matching of the data transfer timing to the recording side and the timing of output data from the second reproducing circuit. For example, for recognizing a recorded video image on a monitor, the data to be copied can be easily confirmed using external equipment.

The image recording and reproducing apparatus of the present invention may also set the timing of the recording synchronizing signal to be delayed for by delay time T2 from the timing of the synchronizing signal of the data supplied to the second recording circuit. This enables the matching of the output data timing of from the second recording circuit and the timing of data supplied from the transfer unit, thereby enabling the control of editing which may require the switching of data sources to be recorded, such as in an AB roll edit. In other words, an AB roll edit can be easily realized by switching input data to the second video tape recorder between data from the transfer unit and data from an external video tape recorder. The AB roll edit is a function, when there is two or more source video tape recorders for editing, such as to input data from a first source video tape recorder between edit points A and B; from a second source video tape recorder between edit points C and D; and from the first source video tape recorder between edit points E and F to a recorder side for recording.

The image recording and reproducing apparatus of the present invention may also set the delay time T3 to the increments of T1 and T2 for enabling the holding of data in the transfer format in the memory of the transfer unit for the time T1+T2. This allows the matching of the timing of the transfer of the video image from the first digital video tape recorder to the second digital video tape recorder and the timing of supplying new external audio data. The new audio data can be supplied to the recording side to match the video data displayed on the external equipment, such as after recording. Thus, the interface between the apparatus of the present invention and external equipment can be realized.

The apparatus of the present invention may also select the reference timing of the apparatus from the reference input, the data input or the free run reference for determining the timing of the recording synchronizing signal by employing the reference input terminal. This allows selection of the reference timing of the apparatus of the present invention from a) the reference input which shows the reference timing for a configuring the system with other editing equipment, b) the reference timing of the input video data for recording from other editing equipment to the second digital video tape recorder, and c) the free run reference timing produced thereby facilitating the building of a system.

As explained above, the image recording and reproducing apparatus of the present invention enables data copying in a specified transfer format, and allows system configuration without the degradation of data such as that which occurs during data copying when using conventional equipment, and without requiring an enlargement of circuit scale and processing circuitry which leads to a higher price.

The image recording and reproducing apparatus of the present invention employs a memory means with a capacity for holding data in the transfer format equivalent to the time difference with a conventional transfer method which connects two digital video tape recorders with a cable, and advances the reference time for the reproduction side to the recording side. This makes it possible to maintain time base compatibility with conventional editing systems, thereby easily realizing an interface with other editing equipment.

The present invention also enables the control of memory capacity and timing to advance the reproduction side as required for easily configuring a system matched to the intended purpose. For example, if the image recording and reproducing apparatus is used as simple data copying equipment, memory may not be required in the image recording and reproducing apparatus of the present invention. This enables data copying with a less expensive system configuration without degrading data copying performance.

Thus, the present invention is an extremely effective apparatus which employs two digital video tape recorders and offers an easy and inexpensive data copying system for directly transferring data if both the reproduction side and recording side employ a data bus with the same format.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An image recording and reproducing apparatus comprising:
  a first digital video tape recorder which comprises:
    first reproducing means for converting first data read from a first tape to a specified transfer format, and outputting the first data to a first data bus synchronized to a reproducing synchronizing signal as first synchronized data, and
    second reproducing means for receiving the first synchronized data on said first data bus, delaying the first synchronized data for a time T1 to produce delayed first synchronized data, converting the delayed first synchronized data to first formatted data, and outputting the first formatted data;
  a second digital video tape recorder which comprises:
    second recording means for receiving and delaying the first formatted data, converting the delayed formatted data to said specified transfer format, and outputting it as second synchronized data to a second data bus synchronized with a recording synchronizing signal, and
    first recording means for receiving the second synchronized data on said second data bus, converting the second synchronized data to a recording format, and recording it on a second tape;
  transfer means for receiving the first synchronized data on said first data bus, delaying the first synchronized data for a time T3, and outputting it to said second data bus synchronized to said recording synchronizing signal; and
  a controller for i) generating said reproducing synchronizing signal having a first timing and recording synchronizing signal having a second timing, and ii) controlling said transfer means, and a timing of said reproducing synchronizing signal is advanced by said time T3 with respect to the second timing of said recording synchronizing signal.

2. An image recording and reproducing apparatus as defined in claim 1, wherein said controller controls switching of data between the second synchronized data from said second recording means and the output data from said transfer means.

3. An image recording and reproducing apparatus as defined in claim 1, wherein said time T3 is equivalent to a data transfer timing of the second digital video tape recorder and a data output timing of said second reproducing means.

4. An image recording and reproducing apparatus as defined in claim 1, wherein a timing of said recording synchronizing signal is delayed by a predetermined time with respect to the timing of a synchronizing signal of input data to said second recording means.

5. An image recording and reproducing apparatus as defined in claim 4, wherein said time T3 is equivalent to a data output timing of said second reproducing means and the input data timing of said second recording means.

6. An image recording and reproducing apparatus as defined in claim 1, wherein a reference input signal is provided to said controller for determining a reference timing of said image recording and reproducing apparatus, said recording synchronizing signal generated based on said reference input signal.

7. An image recording and reproducing apparatus as defined in claim 2, wherein said time T3 is equivalent to a data transfer timing of the second digital recorder and a data output timing of said second reproducing means.

8. An image recording and reproducing apparatus as defined in claim 2, wherein a timing of said recording synchronizing signal is delayed by a predetermined time with respect to the timing of a synchronizing signal of input data to said second recording means.

9. An image recording and reproducing apparatus as defined in claim 2, wherein a reference input signal is provided to said controller for determining a reference timing of said image recording and reproducing apparatus, said recording synchronizing signal generated based on said reference input signal.

10. An image recording and reproducing apparatus comprising:
a first digital recorder;
a second digital recorder;
transfer means coupled between said first digital recorder and said second digital recorder for transferring data between said first digital video tape recorder and said second digital recorder;
control means coupled to said first digital recorder and said second digital recorder, said control means for i) generating a reproducing synchronizing signal having a first timing and a recording synchronizing signal having a second timing, and ii) controlling said transfer means, said data transfer between said first digital recorder and said second digital recorder based on at least one of the reproducing synchronizing signal and said recording synchronizing signal, wherein the first timing of said reproducing synchronizing signal is advanced by a predetermined time with respect to said second timing of said recording synchronizing signal.

11. An image recording and reproducing apparatus as defined in claim 10, wherein said first digital recorder reads first data from a first tape and converts said first data to converted data and said converted data is synchronized with the reproducing synchronizing signal, said second digital recorder receives the synchronized converted data from said first digital recorder and further converts the synchronized converted data to second data and records the second data on a second tape.

12. An image recording and reproducing apparatus as defined in claim 11, wherein said second digital recorder further synchronizes the second data with the recording synchronizing signal prior to recording the second data on the second tape.

* * * * *